(12) United States Patent
Rehorst et al.

(10) Patent No.: US 11,035,681 B2
(45) Date of Patent: Jun. 15, 2021

(54) PRESERVING ORIGINAL ROUTE INFORMATION AFTER RECALCULATION OF A ROUTE

(71) Applicant: VERIZON PATENT AND LICENSING INC., Basking Ridge, NJ (US)

(72) Inventors: Victor J. Rehorst, Whitby (CA); Peter J. Lear, Hamilton (CA); Weiyu Liang, Toronto (CA)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 60 days.

(21) Appl. No.: 16/041,571

(22) Filed: Jul. 20, 2018

(65) Prior Publication Data
US 2020/0025579 A1 Jan. 23, 2020

(51) Int. Cl.
*G01C 21/34* (2006.01)
*G01C 21/36* (2006.01)

(52) U.S. Cl.
CPC ....... *G01C 21/343* (2013.01); *G01C 21/3446* (2013.01); *G01C 21/3679* (2013.01)

(58) Field of Classification Search
CPC .............. G01C 21/343; G01C 21/3446; G01C 21/3679; G01C 21/3415; G01C 21/367; G01C 21/30; G01C 21/34; G01C 21/3407; G01C 21/3476; G01C 21/3682; G01C 21/26; G08G 1/0969; G08G 1/096844; G08G 1/096855; G09B 29/10; G05D 1/0212; G05D 1/0274; G06F 2207/222

USPC .......................................... 701/533, 411, 416
See application file for complete search history.

(56) References Cited

U.S. PATENT DOCUMENTS

| | | | | |
|---|---|---|---|---|
| 6,052,645 A * | 4/2000 | Harada | ............... | G01C 21/3415 340/990 |
| 7,406,381 B2 * | 7/2008 | Obata | ................ | G01C 21/3415 340/995.12 |
| 9,791,285 B2 * | 10/2017 | Chang | ................ | G01C 21/3688 |
| 2001/0005809 A1 * | 6/2001 | Ito | ...................... | G01C 21/3415 701/411 |
| 2006/0229806 A1 * | 10/2006 | Forlenza | ............ | G01C 21/3484 701/411 |
| 2007/0179709 A1 * | 8/2007 | Doyle | ................ | G01C 21/3453 701/417 |

(Continued)

*Primary Examiner* — Fadey S. Jabr
*Assistant Examiner* — Mohamed Abdo Algehaim

(57) ABSTRACT

A device provides, to a navigation device, original route information that includes information indicating directions from an origination to a destination, and waypoints. The device receives, from the navigation device, a request for a new route from a current location to the destination, and receives the original route information when the request is associated with an original route stored in the data structure. The device identifies a point along the original route, closest to the current location, and calculates a route from the point along the original route to the current location. The device combines the route and the original route at the point along the original route to create a new route from the current location to the destination, and provides, to the navigation device, new route information for the new route, where the new route information includes information indicating waypoints between the current location and the destination.

20 Claims, 10 Drawing Sheets

(56) References Cited

U.S. PATENT DOCUMENTS

| | | | | |
|---|---|---|---|---|
| 2008/0275636 A1* | 11/2008 | Hirose | ............... | G01C 21/3415 701/533 |
| 2009/0048776 A1* | 2/2009 | Bouillet | ............. | G01C 21/3446 701/414 |
| 2009/0234577 A1* | 9/2009 | Rinscheid | .......... | G01C 21/3415 701/533 |
| 2010/0030466 A1* | 2/2010 | Rogers | ............... | G01C 21/3415 701/533 |
| 2010/0042319 A1* | 2/2010 | Wu | ...................... | G05D 1/0246 701/408 |
| 2010/0114469 A1* | 5/2010 | Chao | .................. | G01C 21/3484 701/532 |
| 2012/0072107 A1* | 3/2012 | Okude | ................. | G01C 21/343 701/416 |
| 2012/0130630 A1* | 5/2012 | Tang | .................. | G01C 21/3415 701/413 |
| 2012/0143504 A1* | 6/2012 | Kalai | .................... | G01C 21/32 701/533 |
| 2015/0253142 A1* | 9/2015 | Kornhauser | ........... | G01C 21/34 701/522 |
| 2019/0107405 A1* | 4/2019 | Wang | ................. | G01C 21/3446 |

* cited by examiner

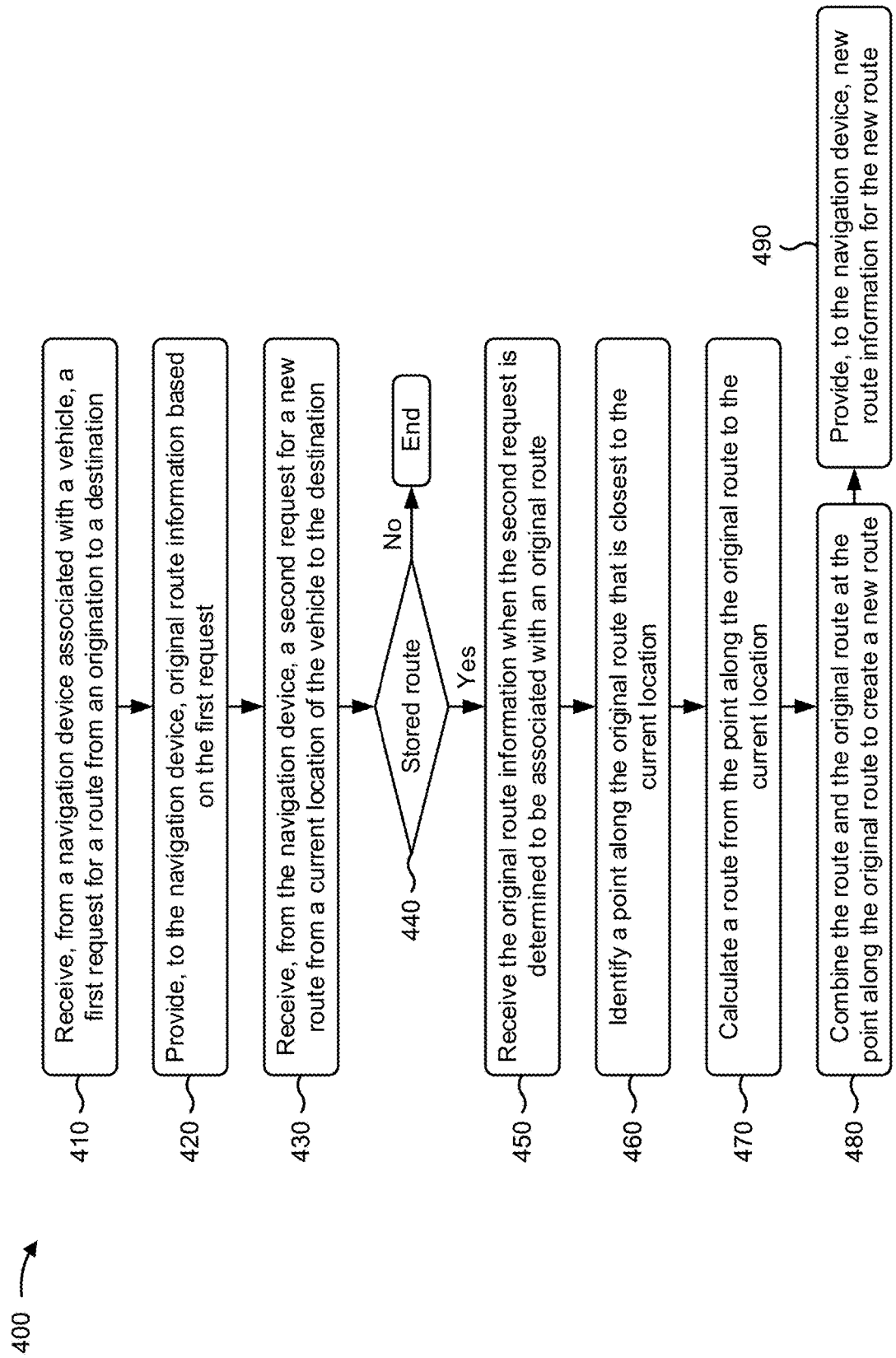

US 11,035,681 B2

1

PRESERVING ORIGINAL ROUTE INFORMATION AFTER RECALCULATION OF A ROUTE

BACKGROUND

A driver of a vehicle may follow route information (e.g., routing or navigation instructions) to a destination. The route information may be received, from a remote server device, by a navigation device associated with the vehicle. The route information may include information associated with one or more locations (e.g., waypoints) inserted by the remote server device in order to fulfill a purpose. The purpose of the waypoints may include, for example, to recommend a location at which to purchase fuel based on an optimal fuel calculation and/or based on navigation of difficult road conditions, to recommend locations selected by rules based on a route origination and destination in order to cause the route to pass through the waypoints, and/or the like.

BRIEF DESCRIPTION OF THE DRAWINGS

FIG. 4 is a flow chart of an example process for preserving original route information after recalculation of a route.

DETAILED DESCRIPTION OF PREFERRED EMBODIMENTS

The following detailed description of example implementations refers to the accompanying drawings. The same reference numbers in different drawings may identify the same or similar elements.

Waypoints may be presented, by a navigation device, as intermediate stops along an original route. A driver of a vehicle may deviate from the original route and then utilize the navigation device to request a new set of directions from a current location to the same destination as the original route. The driver may deviate from the original route based on security reasons, efficiency reasons, traffic conditions, and/or the like. However, the driver may wish to preserve information associated with the original route, such as the waypoints. A remote server device may store an identity of the driver and a location of a destination when providing original route information to the navigation device. However, such information may be the only information linking the request for the new set of directions to the original route information. For example, the remote server device may not store exact routing directions (e.g., including the waypoints) associated with the original route and provided to the navigation device.

Some implementations described herein provide a vehicle platform that preserves original route information after recalculation of a route. For example, the vehicle platform may receive, from a navigation device associated with a vehicle, a first request for a route from an origination to a destination, and may provide, to the navigation device, original route information based on the first request. The original route information may include information indicating directions from the origination to the destination, and information indicating one or more waypoints between the origination and the destination. The vehicle platform may receive, from the navigation device, a second request for a new route from a current location of the vehicle to the destination, and may determine whether the second request is associated with a stored route. The vehicle platform may receive, from a data structure, the original route information when the second request is determined to be associated with an original route stored in the data structure, and may identify a point along the original route that is closest to the current location. The vehicle platform may calculate a route from the point along the original route to the current location, and may combine the route and the original route at the point along the original route to create a new route from the current location to the destination. The vehicle platform may provide, to the navigation device, new route information for the new route, where the new route information may include information indicating directions from the current location to the destination, and information indicating the one or more waypoints between the current location and the destination.

Figure 1A:
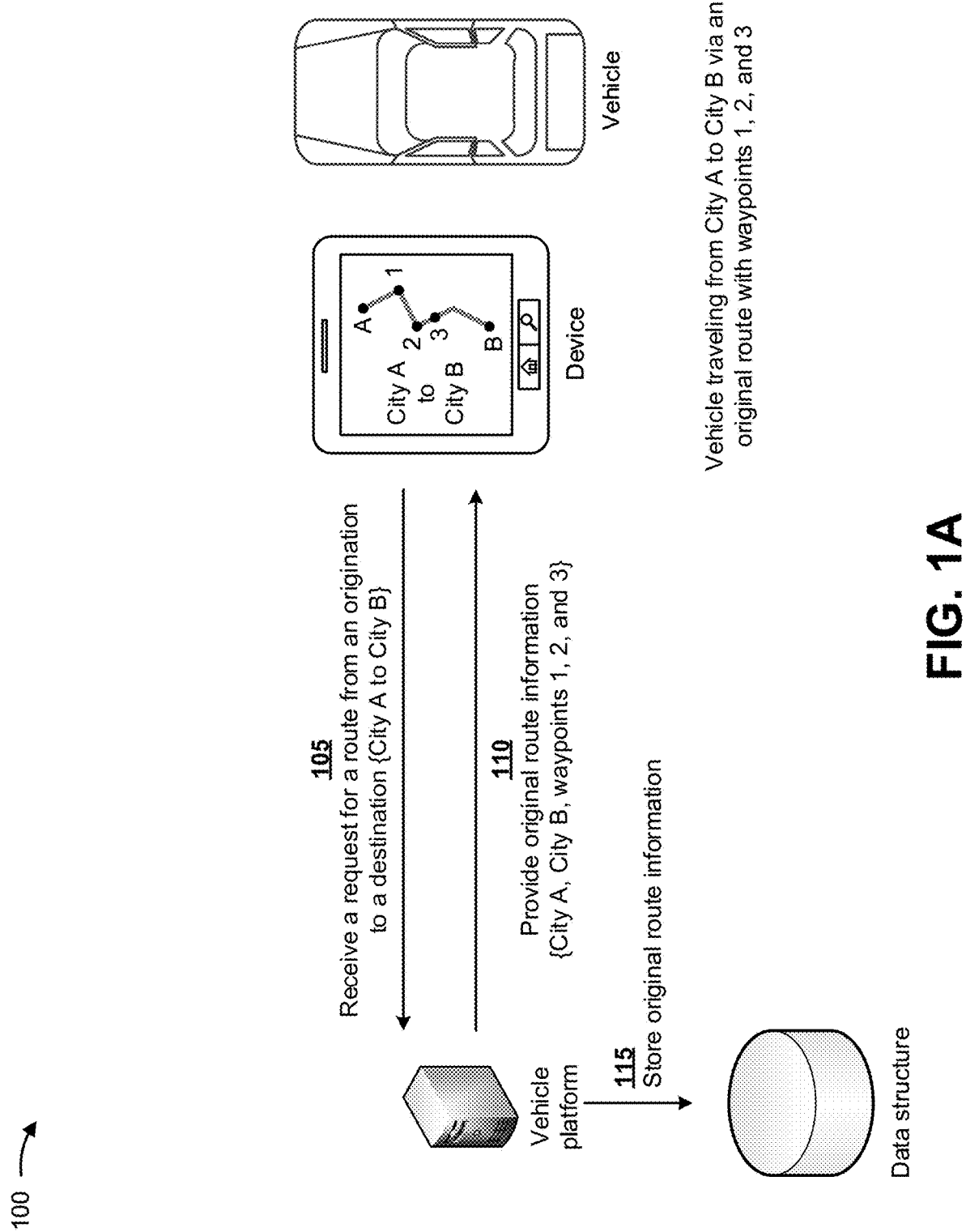
FIGS. 1A-1G are diagrams of an example implementation described herein.

FIGS. 1A-1G are diagrams of an example implementation 100 described herein. As shown in FIG. 1A, a device may be associated with a vehicle and a vehicle platform. In some implementations, the device may be integrated within the vehicle (e.g., an infotainment system of the vehicle) and/or may be a mobile device (e.g., a smart phone, a GPS device, etc.) that is separate from the vehicle. Assume that a driver of the vehicle wishes to travel from an origination (e.g., City A) to a destination (e.g., City B), and utilizes the device to generate a request for a route from the origination to the destination (e.g., City A to City B).

As shown in FIG. 1A, and by reference number 105, the vehicle platform may receive, from the device, the request for the route from the origination to the destination. In some implementations and based on the request, the vehicle platform may calculate an original route from the origination to the destination, and may determine waypoints (e.g., waypoints 1, 2, and 3) located along the original route. In some implementations, the waypoints may include one or more extra locations inserted by the vehicle platform in order to fulfill a purpose. The purpose of the waypoints may include to recommended stops at which to purchase fuel based on an optimal fuel solution, to navigate difficult road conditions (e.g., traffic, construction, etc.), to recommend points chosen by rules based on the origination and the destination in order to cause the original route to pass through the waypoints, and/or the like. In some implementations, the waypoints may be presented as intermediate stops along the original route, may not be presented as intermediate stops along the original route, and/or the like.

As further shown in FIG. 1A, and by reference number 110, the vehicle platform may provide original route information (e.g., $S_{OR}$) to the device. In some implementations, the device may receive the original route information, and may present the original route information to the driver of the vehicle. In some implementations, the original route information may include information indicating the original route from the origination (e.g., City A) to the destination (e.g., City B), the waypoints (e.g., waypoints 1, 2, and 3) located along the original route, points of interest along the original route, an estimated arrival time at the destination based on current traffic conditions, and/or the like.

As further shown in FIG. 1A, and by reference number 115, the vehicle platform may store the original route information in a data structure associated with the vehicle platform. In some implementations, the data structure may include a database, a table, a tree, a linked list, and/or the like, that stores the original route information (e.g., the information indicating the original route from the origination to the destination, the waypoints, and/or the like) in an organized manner. For example, the data structure may include a route identifier field that stores an identifier for the original route information, an original route field that stores information identifying the original route, an origination field that stores information identifying the origination, a destination field that stores information identifying the destination, a waypoints field that stores information identifying the waypoints, information identifying the device that requested the original route, information identifying a user that requested the original route (e.g., regardless of device utilized), and/or the like.

Figure 1B:
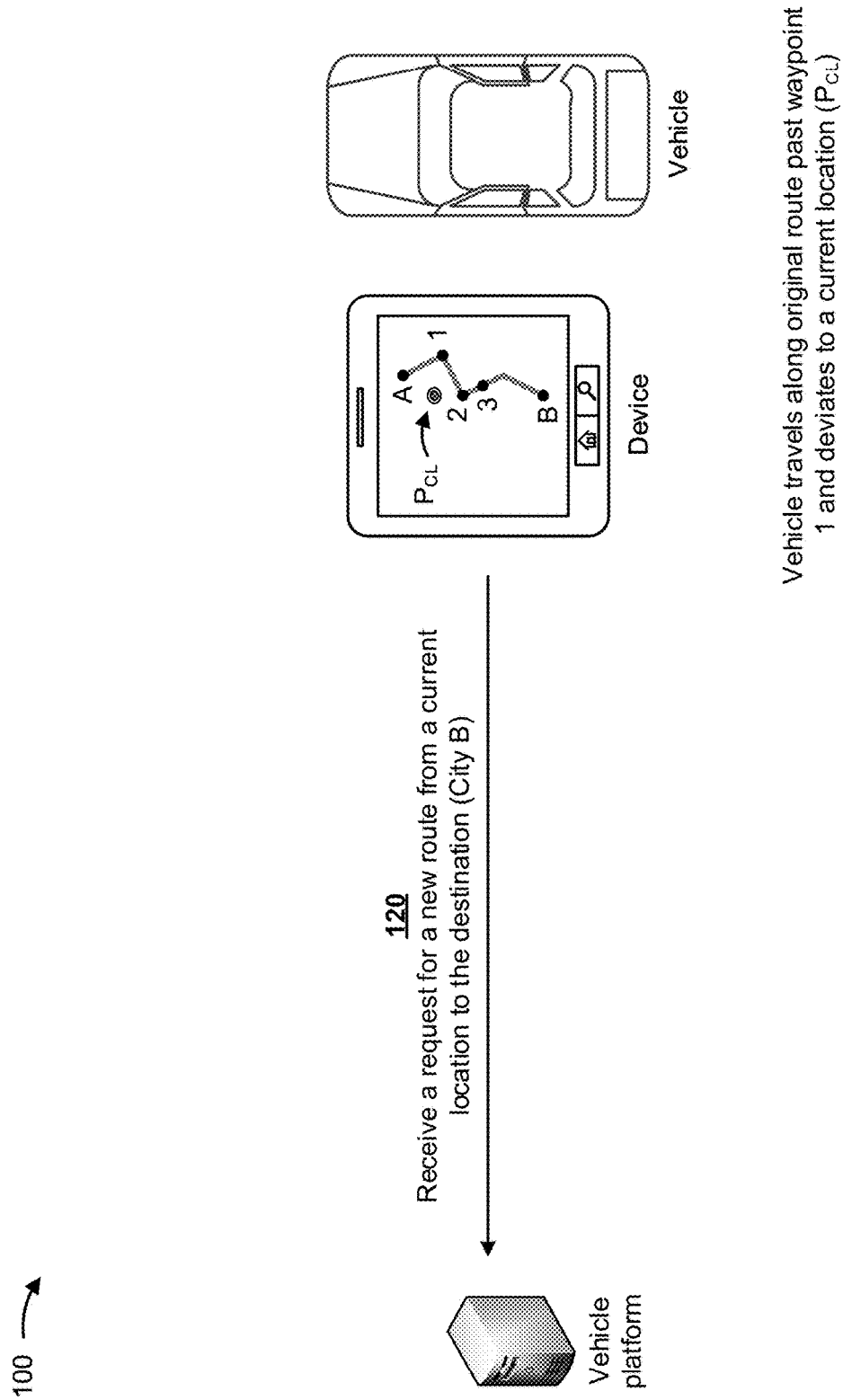

As shown in FIG. 1B, assume that the vehicle travels along the original route past waypoint 1 and then deviates from the original route to a current location (e.g., $P_{CL}$). Further assume that the driver of the vehicle wishes to travel from the current location (e.g., $P_{CL}$) to the destination (e.g., City B), and utilizes the device to generate a request for a new route from the current location to the destination. As further shown in FIG. 1B, and by reference number 120, the vehicle platform may receive, from the device, the request for the new route from the current location to the destination. In some implementations, the device may automatically request the new route from the vehicle platform when the vehicle begins moving from the current location. In some implementations, the vehicle platform may receive, from the device, information indicating the current location, and may automatically determine the new route (e.g., as described below) based on receiving the information indicating the current location. In such implementations, the vehicle platform may determine that the current location deviates from the original route, and may automatically determine the new route based on determining that the current location deviates from the original route.

Figure 1C:
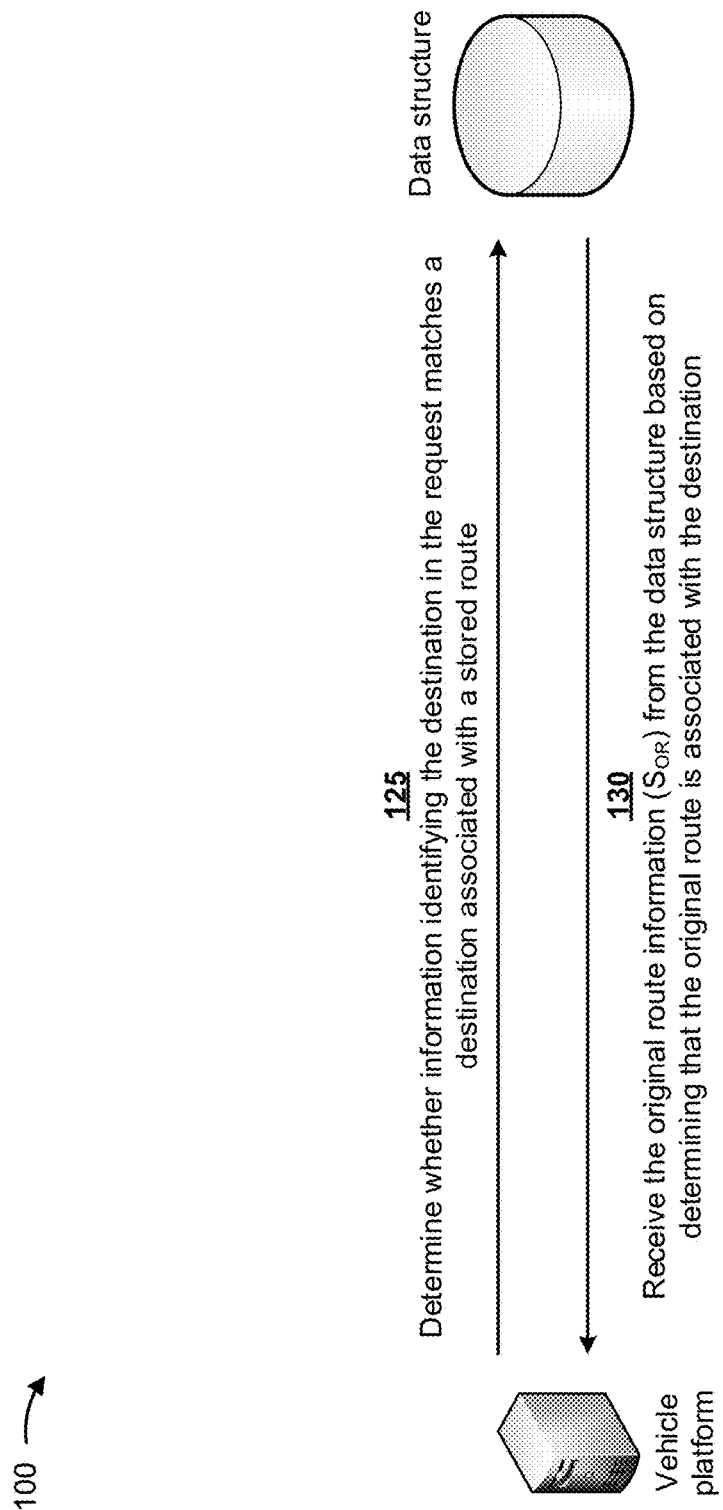

As shown in FIG. 1C, and by reference number 125, the vehicle platform may determine whether information identifying the destination in the request for the new route matches a destination associated with a stored route for the current user and/or the current device utilized by the user. In some implementations, the vehicle platform may compare information identifying the destination with information stored in the destination field of the data structure. In some implementations, if the information identifying the destination does not match information stored in the destination field, the vehicle platform may determine that information identifying the destination in the request for the new route does not match a destination associated with a stored route. In such implementations, the vehicle platform may not receive information from the data structure.

In some implementations, the vehicle platform may perform services for thousands, millions, etc. users, and may store thousands, millions, billions, etc. of records associated with destinations in the data structure. Therefore, the vehicle platform may determine whether the information identifying the destination, for the current user, the current device, the current navigation session, and/or the like, matches information stored in the data structure. For example, if the destination field of the data structure identifies the destination for an original route utilized years ago, for a different user, for a different device, and/or the like, the vehicle platform may determine that information identifying the destination in the request for the new route does not match a destination associated with a stored route (e.g., even though the destination is stored in the data structure).

In some implementations, if the information identifying the destination matches information stored in the destination field (e.g., for a current user and/or a current device), the vehicle platform may determine that information identifying the destination in the request for the new route matches a destination associated with a stored route. In such implementations, and as further shown by reference number 130 in FIG. 1C, the vehicle platform may receive the original route information (e.g., $S_{OR}$) associated with the destination from the data structure and based on determining that the original route is associated with the destination.

Figure 1D:
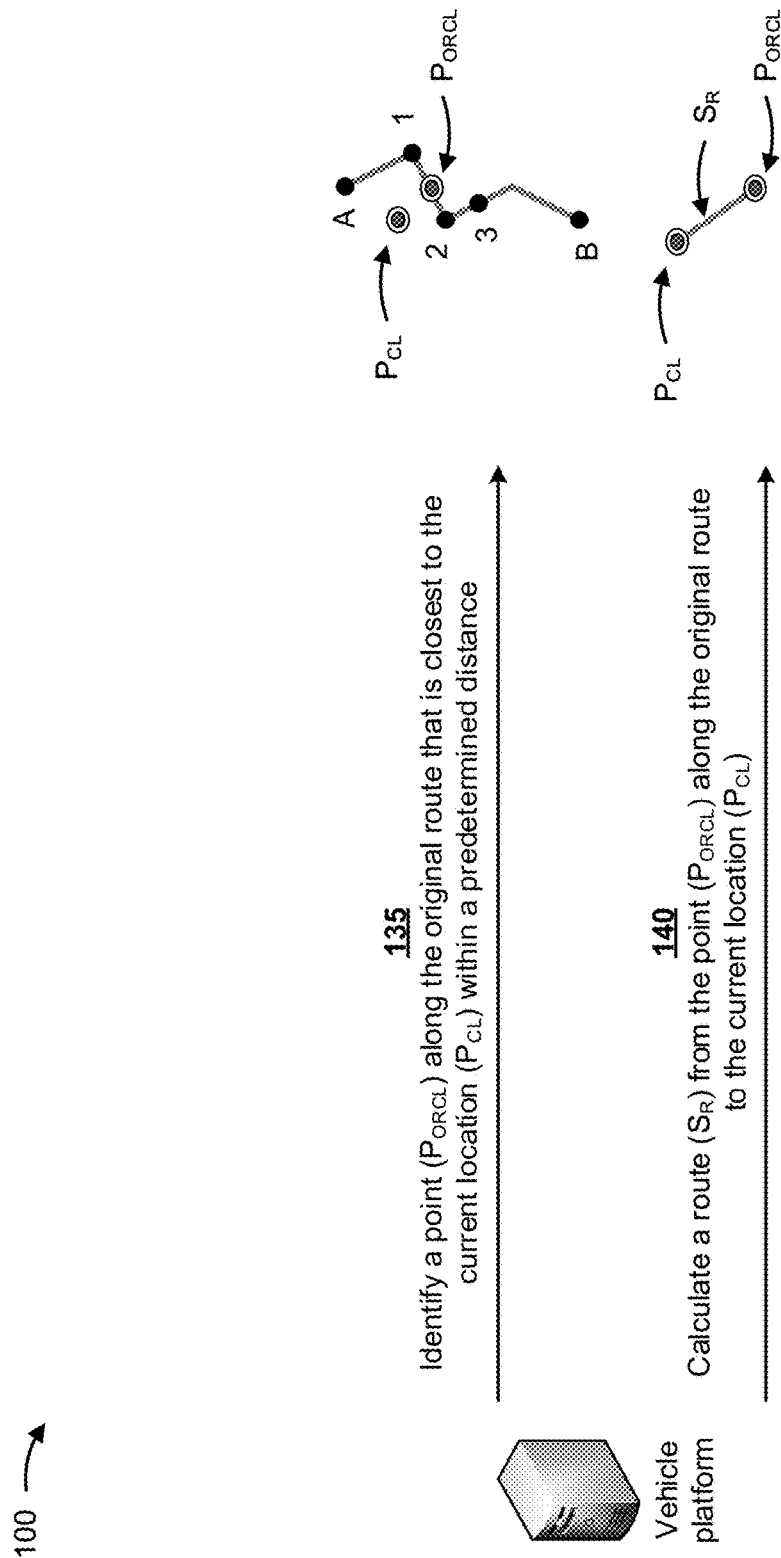

As shown in FIG. 1D, and by reference number 135, the vehicle platform may identify a point (e.g., $P_{ORCL}$) along the original route that is closest to the current location (e.g., $P_{CL}$) within a predetermined distance. In some implementations, the predetermined distance may include a distance represented in meters, decameters, kilometers, and/or the like. In some implementations, the vehicle platform may utilize a distance formula to calculate distances between a first point (e.g., $(x_1, y_1)$ or the current location $P_{CL}$) and second points (e.g., $(x_2, y_2)$) located along the original route, as follows:

$$\text{Distance} = \sqrt{(x_2-x_1)^2 + (y_2-y_1)^2}.$$

In such implementations, the vehicle platform may determine which distance is a shortest distance between the current location (e.g., $P_{CL}$) and a point (e.g., $P_{ORCL}$) along the original route.

As further shown in FIG. 1D, and by reference number 140, the vehicle platform may calculate a route (e.g., $S_R$) from the point (e.g., $P_{ORCL}$) to the current location (e.g., $P_{CL}$). In some implementations, the vehicle platform may calculate the route (e.g., $S_R$) from the point (e.g., $P_{ORCL}$) to the current location (e.g., $P_{CL}$) in a manner similar to the manner the vehicle platform calculated the original route from the origination to the destination.

Figure 1E:
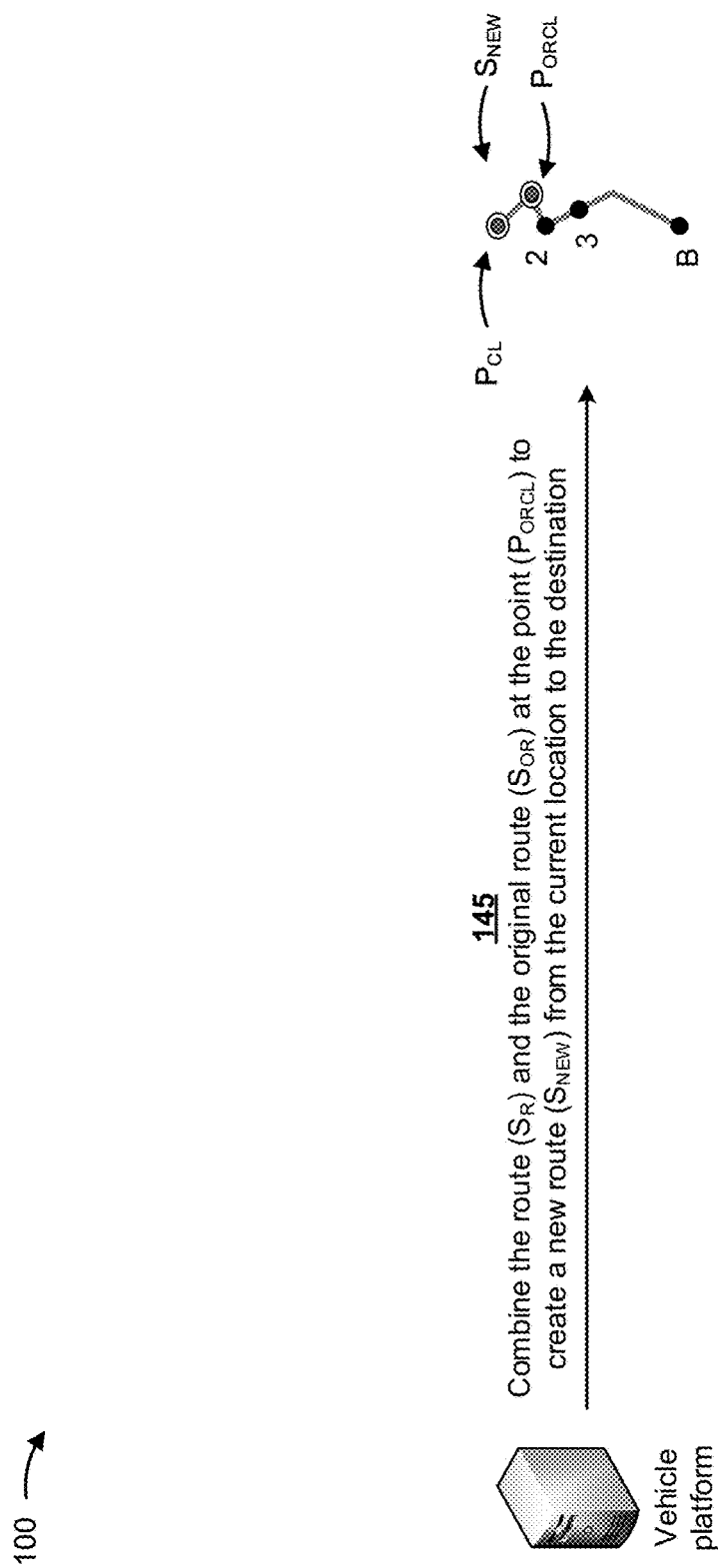

As shown in FIG. 1E, and by reference number 145, the vehicle platform may combine the route (e.g., $S_R$) and the original route, at the point (e.g., $P_{ORCL}$), to create a new route (e.g., $S_{NEW}$) from the current location (e.g., $P_{CL}$) to the destination (e.g., City B). In some implementations, when creating the new route (e.g., $S_{NEW}$), the vehicle platform may remove points from the original route that are located prior to the point (e.g., $P_{ORCL}$), such as a point for the origination, waypoint 1, and/or the like.

Figure 1F:
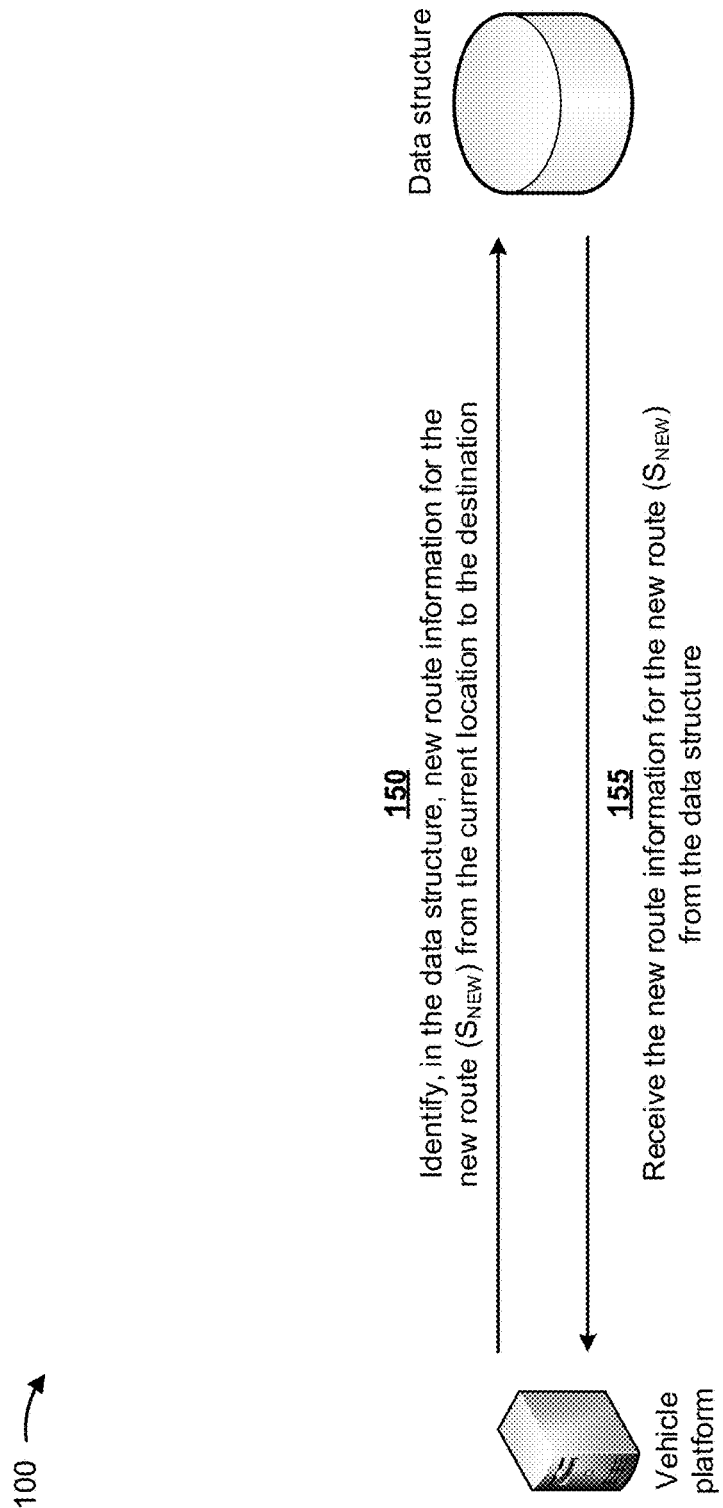

As shown in FIG. 1F, and by reference number 150, the vehicle platform may identify, in the data structure, new route information for the new route (e.g., $S_{NEW}$) from the current location (e.g., $P_{CL}$) to the destination (e.g., City B). In some implementations, the new route information may include information indicating the new route (e.g., $S_{NEW}$) from the current location (e.g., $P_{CL}$) to the destination (e.g., City B), the waypoints (e.g., waypoints 2 and 3) located along the new route, points of interest along the new route, an estimated arrival time at the destination based on current traffic conditions, and/or the like. In some implementations, the new route information may include information indicating one or more new waypoints along the new route (e.g., between the current location and the destination).

In some implementations, the vehicle platform may utilize a binary search model to map the new route to the new route information stored in the data structure. In such implementations, the data structure may include geographic street information, and the vehicle platform may follow points in the new route (e.g., $S_{NEW}$) to create information indicating directions from the current location to the destination, of the new route information, based on the geographic street information stored in the data structure. In some implementations, the binary search model may include a model that identifies a position of a target value within a sorted array. The binary search model may compare the target value to a middle element of the array. If the target value and the middle element are not equal, a half of the array in which the target value cannot lie is eliminated and the search continues on a remaining half of the array. The binary search model may repeat this until the target value is identified. If the search ends with a remaining half of the array being empty, the target value is not in the array. In some implementations, the binary search model may include a uniform binary search model, an exponential search model, an interpolation search model, a fractional cascading model, a noisy binary search model, a quantum binary search model, and/or the like.

As further shown in FIG. 1F, and by reference number 155, the vehicle platform may receive the new route information for the new route from the data structure. In some implementations, the vehicle platform may request the new route information from the data structure, and may receive the new route information from the data structure based on requesting the new route information.

Figure 1G:
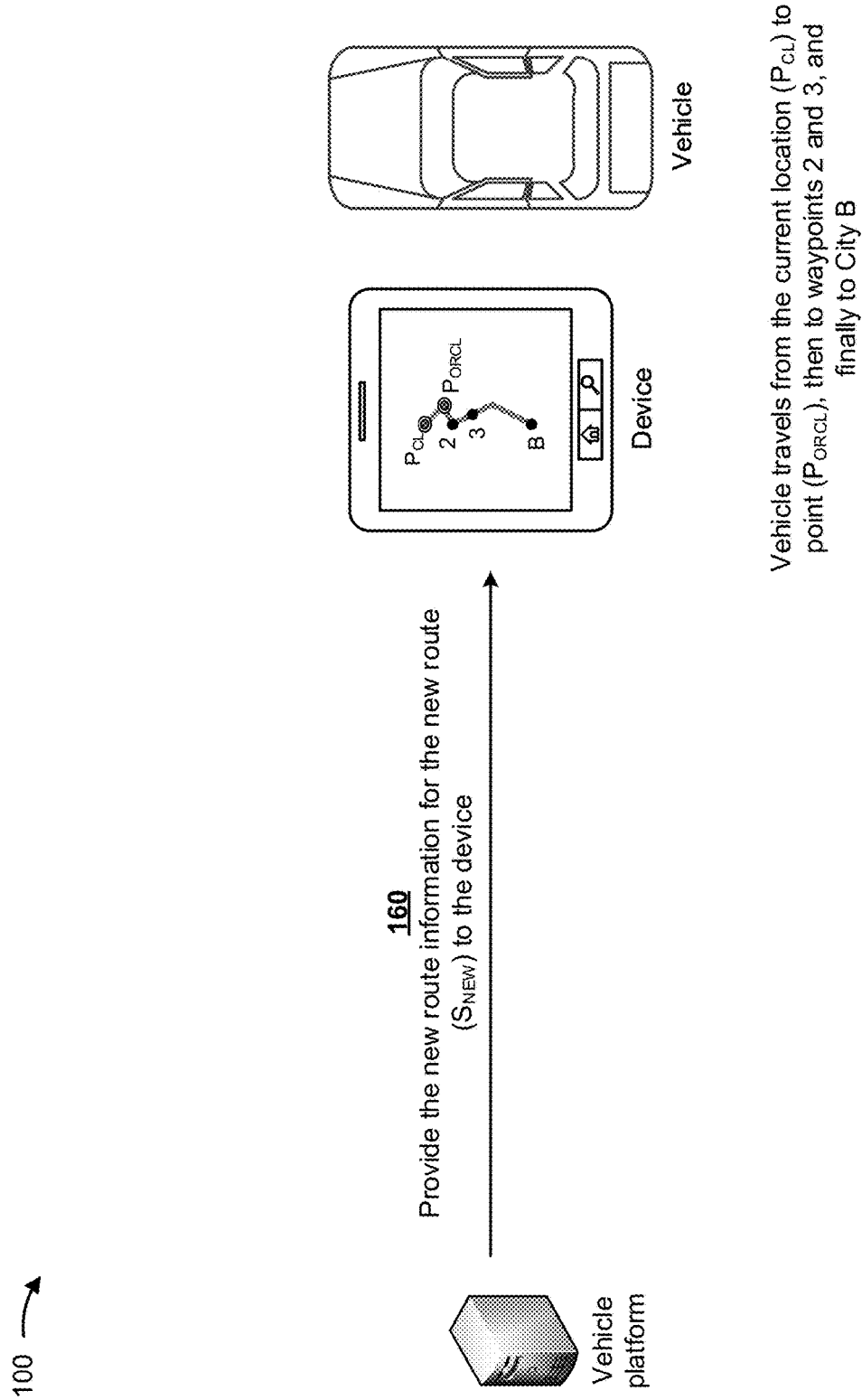

As shown in FIG. 1G, and by reference number 160, the vehicle platform may provide the new route information for the new route (e.g., $S_{NEW}$) to the device. In some implementations, the device may receive the new route information, and may present the new route information to the driver of the vehicle. The driver of the vehicle may utilize the new route information to travel from the current location (e.g., $P_{CL}$) to the point (e.g., $P_{ORCL}$), then to waypoints 2 and 3, and finally to the destination (e.g., City B). In this way, the vehicle platform may preserve the original route information after recalculation of the new route and the new route information. This may enable the driver of the vehicle to be presented with navigation information (e.g., an original route, waypoints along the original route, and/or the like) that were previously presented to the driver via the original route information.

In this way, several different stages of the process for preserving original route information after recalculation of a route are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically preserves original route information after recalculation of a route. Finally, automating the process for preserving original route information after recalculation of a route conserves computing resources (e.g., processing resources, memory resources, and/or the like) associated with the cloud computing environment and that would otherwise be wasted in attempting to preserve original route information after recalculation of a route.

As indicated above, FIGS. 1A-1G are provided merely as examples. Other examples are possible and may differ from what was described with regard to FIGS. 1A-1G.

Figure 2:
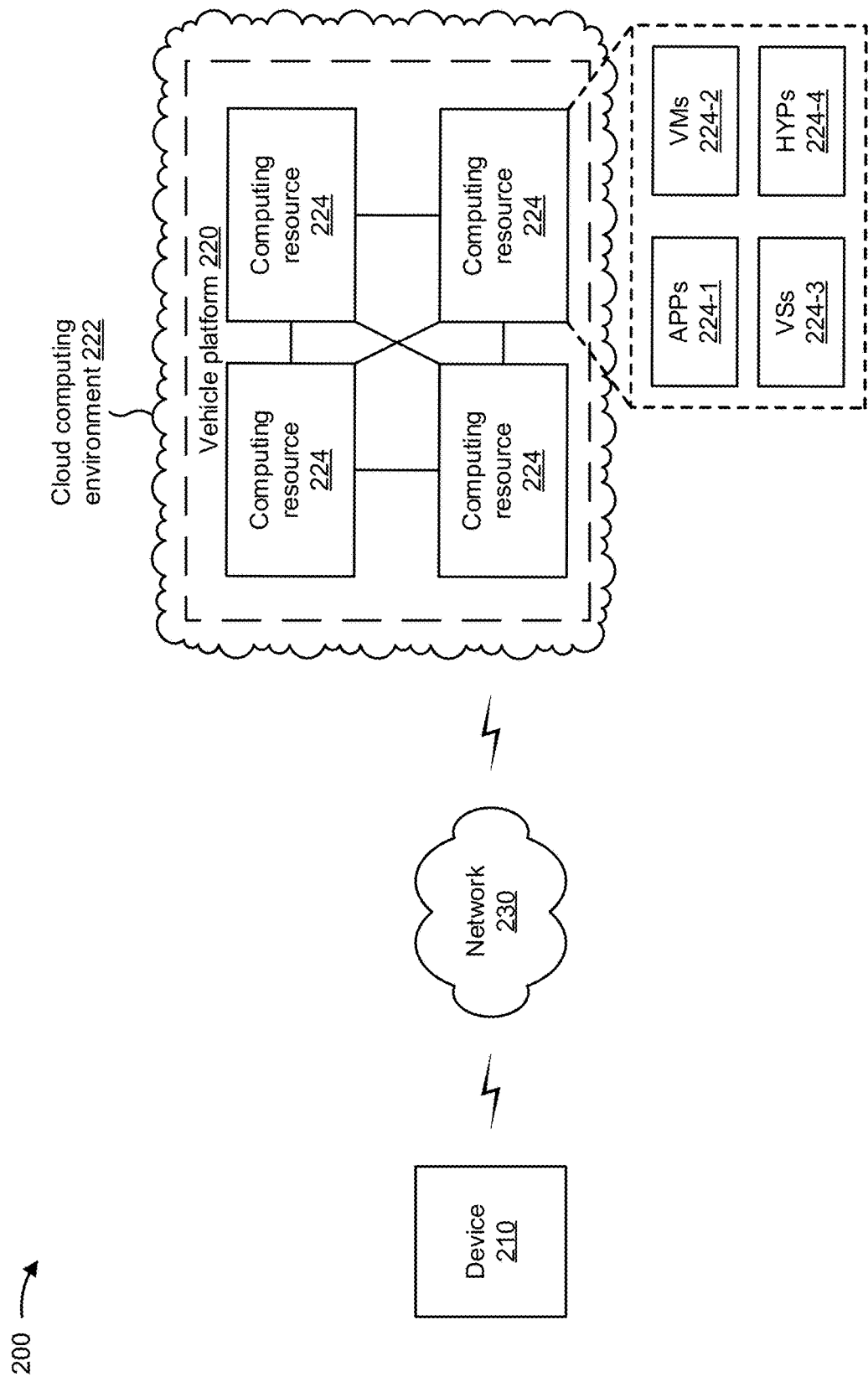
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a device 210, a vehicle platform 220, and a network 230. Devices of environment 200 may interconnect via wired connections, wireless connections, or a combination of wired and wireless connections.

Device 210 includes one or more devices capable of receiving, generating, storing, processing, and/or providing information, such as information described herein. In some implementations, device 210 may include a device integrated within vehicle, such as an in-vehicle infotainment (IVI) system, an in-car entertainment (ICE) system, a telematics device, a Global Positioning System (GPS) device, or a similar type of device. In some implementations, device 210 may include a device that is separate from but associated with a vehicle, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a GPS device, or a similar type of device. In some implementations, device 210 may receive information from and/or transmit information to vehicle platform 220.

Vehicle platform 220 includes one or more devices that preserves original route information after recalculation of a route. In some implementations, vehicle platform 220 may be designed to be modular such that certain software components may be swapped in or out depending on a particular need. As such, vehicle platform 220 may be easily and/or quickly reconfigured for different uses. In some implementations, vehicle platform 220 may receive information from and/or transmit information to one or more devices 210.

In some implementations, as shown, vehicle platform 220 may be hosted in a cloud computing environment 222. Notably, while implementations described herein describe vehicle platform 220 as being hosted in cloud computing environment 222, in some implementations, vehicle platform 220 may not be cloud-based (i.e., may be implemented outside of a cloud computing environment) or may be partially cloud-based.

Cloud computing environment 222 includes an environment that hosts vehicle platform 220. Cloud computing environment 222 may provide computation, software, data access, storage, etc. services that do not require end-user knowledge of a physical location and configuration of system(s) and/or device(s) that host vehicle platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host vehicle platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by device 210. Application 224-1 may eliminate a need to install and execute the software applications on device 210. For example, application 224-1 may include software associated with vehicle platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of device 210 or an operator of vehicle platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
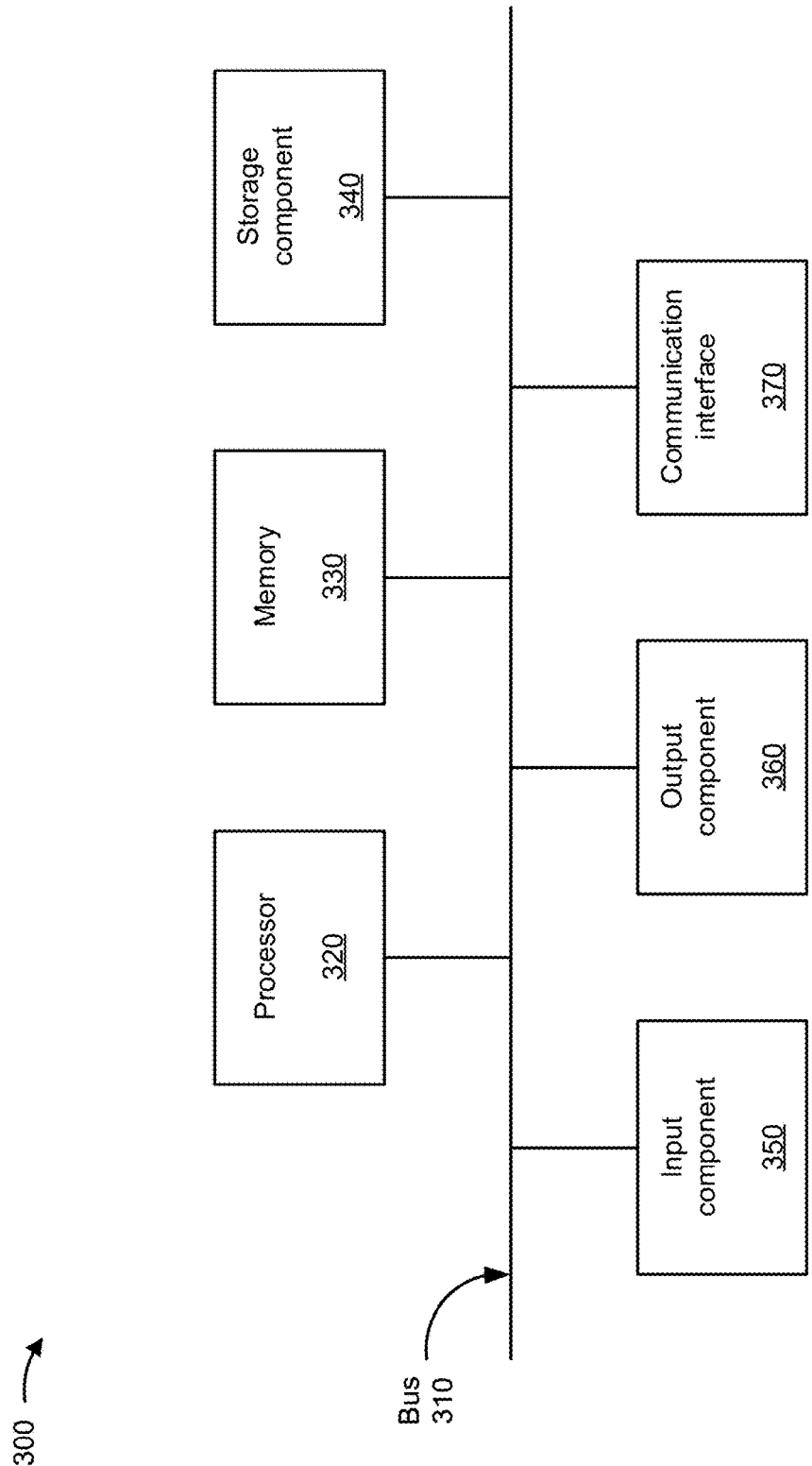
FIG. 3 is a diagram of example components of one or more devices of FIG. 2.

FIG. 3 is a diagram of example components of a device 300. Device 300 may correspond to device 210, vehicle platform 220, and/or computing resource 224. In some implementations, device 210, vehicle platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for preserving original route information after recalculation of a route. In some implementations, one or more process blocks of FIG. 4 may be performed by a vehicle platform (e.g., vehicle platform 220). In some implementations, one or more process blocks of FIG. 4 may be performed by another device or a group of devices separate from or including the vehicle platform, such as a device (e.g., device 210).

As shown in FIG. 4, process 400 may include receiving, from a navigation device associated with a vehicle, a first request for a route from an origination to a destination (block 410). For example, the vehicle platform (e.g., using computing resource 224, processor 320, communication interface 370, and/or the like) may receive, from a navigation device associated with a vehicle, a first request for a route from an origination to a destination, as described above in connection with FIGS. 1A-2.

As further shown in FIG. 4, process 400 may include provide, to the navigation device, original route information based on the first request, the original route information including information indicating directions from the origination to the destination, and information indicating one or more waypoints between the origination and the destination (block 420). For example, the vehicle platform (e.g., using computing resource 224, processor 320, memory 330, communication interface 370, and/or the like) may provide, to the navigation device, original route information based on the first request, as described above in connection with FIGS. 1A-2. In some implementations, the original route information may include information indicating directions from the origination to the destination, and information indicating one or more waypoints between the origination and the destination, as described above in connection with FIGS. 1A-2.

As further shown in FIG. 4, process 400 may include receiving, from the navigation device, a second request for a new route from a current location of the vehicle to the destination (block 430). For example, the vehicle platform (e.g., using computing resource 224, processor 320, communication interface 370, and/or the like) may receive, from the navigation device, a second request for a new route from a current location of the vehicle to the destination, as described above in connection with FIGS. 1A-2.

As further shown in FIG. 4, process 400 may include determining whether the second request is associated with a stored route (block 440). For example, the vehicle platform (e.g., using computing resource 224, processor 320, communication interface 370, and/or the like) may determine whether the second request is associated with a stored route, as described above in connection with FIGS. 1A-2. In some implementations, the vehicle platform may end the process when the second request is not associated with a stored route.

As further shown in FIG. 4, process 400 may include receiving, from a data structure, the original route information when the second request is determined to be associated with an original route stored in the data structure (block 450). For example, the vehicle platform (e.g., using computing resource 224, processor 320, memory 330, communication interface 370, and/or the like) may receive, from a data structure, the original route information when the second request is determined to be associated with an original route stored in the data structure, as described above in connection with FIGS. 1A-2.

As further shown in FIG. 4, process 400 may include identifying a point along the original route that is closest to the current location (block 460). For example, the vehicle platform (e.g., using computing resource 224, processor 320, storage component 340, and/or the like) may identify a point along the original route that is closest to the current location, as described above in connection with FIGS. 1A-2.

As further shown in FIG. 4, process 400 may include calculating a route from the point along the original route to the current location (block 470). For example, the vehicle platform (e.g., using computing resource 224, processor 320, memory 330, and/or the like) may calculate a route from the point along the original route to the current location, as described above in connection with FIGS. 1A-2.

As further shown in FIG. 4, process 400 may include combining the route and the original route at the point along the original route to create a new route from the current location to the destination (block 480). For example, the vehicle platform (e.g., using computing resource 224, processor 320, storage component 340, and/or the like) may combine the route and the original route at the point along the original route to create a new route from the current location to the destination, as described above in connection with FIGS. 1A-2.

As further shown in FIG. 4, process 400 may include providing, to the navigation device, new route information for the new route, the new route information including information indicating directions from the current location to the destination, and information indicating the one or more waypoints between the current location and the destination (block 490). For example, the vehicle platform (e.g., using computing resource 224, processor 320, communication interface 370, and/or the like) may provide, to the navigation device, new route information for the new route. In some implementations, the new route information may include information indicating directions from the current location to the destination, and information indicating the one or more waypoints between the current location and the destination, as described above in connection with FIGS. 1A-2.

Process 400 may include additional implementations, such as any single implementation or any combination of implementations described below and/or described with regard to any other process described herein.

In some implementations, when determining whether the second request is associated with the stored route, the vehicle platform may determine that the destination identified in the second request is associated with the destination of the original route stored in the data structure, and may determine that the original route information is associated with the original route based on determining that the destination identified in the second request is associated with the destination of the original route.

In some implementations, when receiving the original route information, the vehicle platform may receive, from the data structure, the original route information based on determining that the original route information is associated with the original route. In some implementations, when identifying the point along the original route that is closest to the current location, the vehicle platform may identify the point along the original route that is closest to the current location based on a predetermined distance between the point and the current location.

In some implementations, the vehicle platform may identify, in the data structure, the new route information for the new route from the current location to the destination, and may receive the new route information for the new route from the data structure. In some implementations, the new route information may include information indicating one or more new waypoints between the current location and the destination.

In some implementations, the vehicle platform may utilize a binary search model to map the new route to the new route information, and may create the information indicating the directions from the current location to the destination, of the new route information, based on geographic street information stored in the data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a vehicle platform that preserves original route information after recalculation of a route. For example, the vehicle platform may receive, from a navigation device associated with a vehicle, a first request for a route from an origination to a destination, and may provide, to the navigation device, original route information based on the first request. The original route information may include information indicating directions from the origination to the destination, and information indicating one or more waypoints between the origination and the destination. The vehicle platform may receive, from the navigation device, a second request for a new route from a current location of the vehicle to the destination, and may determine whether the second request is associated with a stored route. The vehicle platform may receive, from a data structure, the original route information when the second request is determined to be associated with an original route stored in the data structure, and may identify a point along the original route that is closest to the current location. The vehicle platform may calculate a route from the point along the original route to the current location, and may combine the route and the original route at the point along the original route to create a new route from the current location to the destination. The vehicle platform may provide, to the navigation device, new route information for the new route, where the new route information may include information indicating directions from the current location to the destination, and information indicating the one or more waypoints between the current location and the destination.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
 receive, from a navigation device associated with a vehicle, a first request for a first route from an origination to a destination;
 provide, to the navigation device, first route information based on the first request,
  the first route information including:
   information indicating directions from the origination to the destination, and
   information indicating one or more waypoints between the origination and the destination;
 receive, from the navigation device, sensing information from a sensor indicating a current location of the navigation device;
 receive, from the navigation device and based on receiving the sensing information, a second request for a second route from the current location of the vehicle to the destination,
  the second request being automatically requested by the navigation device when the vehicle begins moving from the current location;
 determine whether the second request is associated with a stored route;
 receive, from a data structure, the first route information when the second request is determined to be associated with an original route stored in the data structure;
 identify a point along the first route that is closest to the current location;
 calculate a third route from the point along the first route to the current location;
 combine the third route and the first route at the point along the first route to create the second route from the current location to the destination;
 utilize a binary search model to map the second route to second route information for the second route,
  wherein the binary search model identifies a position of a target value within a sorted array of the data structure; and
 provide, to the navigation device, the second route information,
  the second route information including:
   information indicating directions from the current location to the destination, and
   information indicating the one or more waypoints between the current location and the destination.

2. The device of claim 1, wherein the one or more processors, when determining whether the second request is associated with the stored route, are to:
 determine that the destination identified in the second request is associated with the destination of the first route stored in the data structure; and
 determine that the first route information is associated with the first route based on determining that the destination identified in the second request is associated with the destination of the first route.

3. The device of claim 2, wherein the one or more processors, when receiving the first route information, are to:
 receive, from the data structure, the first route information based on determining that the first route information is associated with the first route.

4. The device of claim 1, wherein, when identifying the point along the first route that is closest to the current location, the one or more processors are to:
 identify the point along the first route that is closest to the current location based on a predetermined distance between the point and the current location.

5. The device of claim 1, wherein the one or more processors are further to:
 identify, in the data structure, the second route information for the second route from the current location to the destination; and
 receive the second route information for the second route from the data structure.

6. The device of claim 1, wherein the second route information includes:
 information indicating one or more new waypoints between the current location and the destination.

7. The device of claim 1, wherein the one or more processors are further to:
 create the information indicating the directions from the current location to the destination, of the second route information, based on geographic street information stored in the data structure.

8. A non-transitory computer-readable medium storing instructions, the instructions comprising:
 one or more instructions that, when executed by one or more processors of a device, cause the one or more processors to:
  receive, from a navigation device associated with a vehicle, a first request for a first route from an origination to a destination;
  provide, to the navigation device, first route information based on the first request,
   the first route information including:
    information indicating directions from the origination to the destination, and
    information indicating one or more waypoints between the origination and the destination;
  receive, from the navigation device, sensing information from a sensor indicating a current location of the navigation device;
  receive, from the navigation device and based on receiving the sensing information, a second request for a second route from the current location of the vehicle to the destination,
   the second request being automatically requested by the navigation device when the vehicle begins moving from the current location;
  determine whether the second request is associated with a stored route;
  receive, from a data structure, the first route information when the second request is determined to be associated with an original route stored in the data structure;
  identify a point along the first route that is closest to the current location;
  calculate a third route from the point along the first route to the current location;
  utilize a binary search model to map the second route to second route information for the second route, wherein the binary search model identifies a position of a target value within a sorted array of the data structure;

combine the third route and the first route at the point along the first route to create the second route from the current location to the destination; and provide, to the navigation device, the second route information, the second route information including:
information indicating directions from the current location to the destination, and
information indicating the one or more waypoints between the current location and the destination.

9. The non-transitory computer-readable medium of claim 8, wherein the one or more instructions, that cause the one or more processors to determine whether the second request is associated with the stored route, comprise:

one or more instructions that, when executed by the one or more processors, cause the one or more processors to:

determine that the destination identified in the second request is associated with the destination of the original route stored in the data structure; and determine that the first route information is associated with the first route based on determining that the destination identified in the second request is associated with the destination of the first route.

10. The non-transitory computer-readable medium of claim 9, wherein the one or more instructions, that cause the one or more processors to receive the first route information, comprise:

one or more instructions that, when executed by the one or more processors, cause the one or more processors to:

receive, from the data structure, the first route information based on determining that the first route information is associated with the first route.

11. The non-transitory computer-readable medium of claim 8, wherein the one or more instructions, that cause the one or more processors to identify the point along the first route that is closest to the current location, comprise:

one or more instructions that, when executed by the one or more processors, cause the one or more processors to:

identify the point along the first route that is closest to the current location based on a predetermined distance between the point and the current location.

12. The non-transitory computer-readable medium of claim 8, wherein the instructions further comprise:

one or more instructions that, when executed by the one or more processors, cause the one or more processors to:

identify, in the data structure, the second route information for the second route from the current location to the destination; and receive the second route information for the second route from the data structure.

13. The non-transitory computer-readable medium of claim 8, wherein the second route information includes:
information indicating one or more new waypoints between the current location and the destination.

14. The non-transitory computer-readable medium of claim 8, wherein the instructions further comprise:

one or more instructions that, when executed by the one or more processors, cause the one or more processors to:

create the information indicating the directions from the current location to the destination, of the second route information, based on geographic street information stored in the data structure.

15. A method, comprising:

receiving, by a device and from a navigation device associated with a vehicle, a first request for a first route from an origination to a destination;

providing, by the device and to the navigation device, first route information based on the first request, the first route information including:
information indicating directions from the origination to the destination, and
information indicating one or more waypoints between the origination and the destination;

receiving, from the device, sensing information from a sensor indicating a current location of the device;

receiving, by the device, from the navigation device, and based on receiving the sensing information, a second request for a second route from a current location of the vehicle to the destination, the second request being automatically requested by the navigation device when the vehicle begins moving from the current location;

determining, by the device, whether the second request is associated with a stored route;

receiving, by the device and from a data structure, the first route information when the second request is determined to be associated with an original route stored in the data structure;

identifying, by the device, a point along the first route that is closest to the current location;

calculating, by the device, a third route from the point along the first route to the current location;

combining, by the device, the third route and the first route at the point along the first route to create the second route from the current location to the destination;

utilizing, by the device, a binary search model to map the second route to second route information for the second route, the binary search model identifying a position of a target value within a sorted array of the data structure; and providing, by the device and to the navigation device, the second route information, the second new route information including:
information indicating directions from the current location to the destination, and
information indicating the one or more waypoints between the current location and the destination.

16. The method of claim 15, wherein determining whether the second request is associated with the stored route comprises:

determining that the destination identified in the second request is associated with the destination of the original route stored in the data structure; and determining that the first route information is associated with the first route based on determining that the destination identified in the second request is associated with the destination of the first route.

17. The method of claim 16, wherein receiving the first route information, comprises:

receiving, from the data structure, the first route information based on determining that the first route information is associated with the first original route.

18. The method of claim 15, wherein identifying the point along the first route that is closest to the current location comprises:
    identifying the point along the first route that is closest to the current location based on a predetermined distance between the point and the current location.

19. The method of claim 15, further comprising:
identifying, in the data structure, the second route information for the second route from the current location to the destination; and
receiving the second route information for the second route from the data structure.

20. The method of claim 15, further comprising:
creating the information indicating the directions from the current location to the destination, of the second route information, based on geographic street information stored in the data structure.

\* \* \* \* \*